US009304955B2

(12) United States Patent
Kegel

(10) Patent No.: US 9,304,955 B2
(45) Date of Patent: Apr. 5, 2016

(54) TECHNIQUES FOR IDENTIFYING AND HANDLING PROCESSOR INTERRUPTS

(71) Applicant: ADVANCED MICRO DEVICES, INC., Sunnyvale, CA (US)

(72) Inventor: Andrew G. Kegel, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 476 days.

(21) Appl. No.: 13/718,841

(22) Filed: Dec. 18, 2012

(65) Prior Publication Data
US 2014/0173152 A1  Jun. 19, 2014

(51) Int. Cl.
*G06F 21/57* (2013.01)
*G06F 21/82* (2013.01)
*G06F 21/74* (2013.01)
*G06F 13/24* (2006.01)

(52) U.S. Cl.
CPC .............. *G06F 13/24* (2013.01); *G06F 21/572* (2013.01); *G06F 21/74* (2013.01); *G06F 21/82* (2013.01)

(58) Field of Classification Search
CPC ....... G06F 21/572; G06F 21/82; G06F 21/74; H04L 63/1458
See application file for complete search history.

(56) References Cited

U.S. PATENT DOCUMENTS

| | | | | |
|---|---|---|---|---|
| 5,764,999 | A * | 6/1998 | Wilcox et al. | 710/261 |
| 5,913,071 | A * | 6/1999 | Macomber | 712/40 |
| 6,000,002 | A * | 12/1999 | Bonitz | 710/260 |
| 7,099,977 | B2 * | 8/2006 | Chong et al. | 710/262 |
| 7,165,135 | B1 * | 1/2007 | Christie et al. | 710/269 |
| 7,814,224 | B2 * | 10/2010 | Maruyama et al. | 709/235 |
| 2003/0084322 | A1 * | 5/2003 | Schertz et al. | 713/200 |
| 2003/0149888 | A1 * | 8/2003 | Yadav | 713/200 |
| 2003/0159060 | A1 * | 8/2003 | Gales et al. | 713/200 |
| 2008/0140895 | A1 * | 6/2008 | Baker et al. | 710/262 |
| 2009/0157936 | A1 * | 6/2009 | Goss et al. | 710/264 |
| 2009/0235005 | A1 * | 9/2009 | Hawk et al. | 710/268 |
| 2010/0192029 | A1 * | 7/2010 | Wang et al. | 714/723 |
| 2012/0297057 | A1 * | 11/2012 | Ghosh et al. | 709/224 |

OTHER PUBLICATIONS

Application for United States Letters Patent for "Method and Apparatus for Controlling System Interrupts," by Andrew G. Kegel and Mark Hummel (Not Yet Published).

* cited by examiner

*Primary Examiner* — Dede Zecher
*Assistant Examiner* — Jason C Chiang
(74) *Attorney, Agent, or Firm* — Park, Vaughan, Fleming & Dowler LLP

(57) ABSTRACT

A method for identifying and reporting interrupt behavior includes incrementing a counter when an interrupt signal is a designated type and is not received from an approved peripheral device, and performing a corrective action when the counter reaches a threshold value. In some embodiments, the designated type of the interrupt signal comprises a System Management Interrupt (SMI), which has the capability of halting operations at all processors within a system to execute associated instructions within a protected circumstance, resuming normal operations for each of the plurality of processors when the corrective action has been completed. In another embodiment, the corrective action includes creating a report identifying, within the same protected circumstance, the interrupt signal as an SMI. In some embodiments, the method performs a different corrective action when an interrupt signal is a designated type and is received from an approved peripheral device and decrements a counter. In some embodiments, the interrupt signal includes information indicating its source.

12 Claims, 4 Drawing Sheets

TECHNIQUES FOR IDENTIFYING AND HANDLING PROCESSOR INTERRUPTS

TECHNICAL FIELD

Embodiments of the subject matter described herein relate generally to System Management Interrupts (SMIs) used within a computer system. More particularly, embodiments of the subject matter relate to identifying and reporting SMI behavior.

BACKGROUND

Typical computer systems are generally comprised of a processor, memory, and external devices. Ordinarily, the central processing unit (CPU) is busy executing instructions retrieved from memory that are associated with an operating system and one or more application programs, such as a word processor, a graphics program, a game, or the like. However, execution of these application programs may be temporarily suspended to handle more urgent matters. For example, in some computer systems, the external devices are configured to generate interrupt signals that are associated with a high priority concern, such as a hardware error, a low-voltage or power-loss situation, a high system temperature, or the like. These types of interrupts are generally known as System Management Interrupts (SMIs), and are generally executed in System Management Mode (SMM), wherein execution of all normal processes is suspended in favor of the execution of an SMI in a protected environment. Owing to the urgency of this type of message, the processor temporarily halts execution of the application program while executing an SMI handling routine that identifies a course of action to be taken by the processor in response to the particular type of interrupt.

Those skilled in the art will appreciate that if one or more of the external devices generates a significant number of SMIs, the operation of the processor may be substantially engaged in executing the numerous interrupt handling routines, rather than executing the application programs. Such a condition may appear to the user as a slow and unresponsive application program.

In some instances, one or more peripheral devices may fail or otherwise begin to operate in an undesirable fashion in which numerous SMIs are generated. In other instances, an attack, commonly known as an SMI storm, may occur in which the security of one or more peripheral devices may be compromised and put into a mode of operation in which a rapid sequence of SMI interrupts are generated to intentionally slow or substantially freeze the operation of the processor with respect to the application programs.

Some computer systems allow a guest operating system (OS) in a virtualized system to have direct access to virtual peripheral devices. Thus, an initial attack may take the form of loading a rogue guest OS. In such a situation, software in the guest OS can mal-program the peripheral to generate an SMI storm and thereby mount a denial of service (DoS) attack against other guest operating systems. Attacks such as an SMI storm are highly undesirable, as they prevent the computer system from performing its main task of executing the application program.

BRIEF SUMMARY OF EMBODIMENTS

Some embodiments provide a method for identifying and reporting interrupt behavior. The method increments a counter when an interrupt signal is a designated type and is not received from an approved peripheral device and performs a corrective action when the counter reaches a threshold value.

Some embodiments provide a method for handling a denial of service (DoS) attack. The method receives an interrupt signal in a system; enters a protected mode of operation; and determines, based on a type and a source of the interrupt signal, whether execution of a set of executable instructions associated with the interrupt signal is permitted. When execution of the set of executable instructions associated with the interrupt signal is not permitted, the method records data describing a condition of the system and information relating to the interrupt signal, and exits the protected mode of operation.

Some embodiments provide a method for handling SMI behavior. The method receives a System Management Interrupt (SMI) signal, wherein the SMI signal is associated with a set of SMI instructions; enters the set of SMI instructions; and determines whether the SMI signal is from one of a plurality of verified sources. When the SMI signal is from one of the plurality of verified sources, the method takes corrective action with regard to one of the plurality of verified sources, decrements a counter, and exits the set of SMI instructions. When the SMI signal is not from one of the plurality of verified sources, the method increments the counter. When the counter reaches a pre-determined threshold value, the method creates a report including properties of the SMI signal, and the method then exits the set of SMI instructions.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used by a software-based System Management Interrupt (SMI) handler operating within the firmware of a computer system. In some embodiments, an SMI is sent to the SMI handler within firmware of a computer system, and the SMI handler determines whether or not the SMI originated within an approved source. An "approved" source may be defined as a pre-defined, verified, or otherwise approved source. When the SMI did not originate from one of these approved sources, the SMI handler increments a counter. When the counter reaches a pre-determined threshold value due to an excessive number of SMIs (e.g., an SMI "storm"), the SMI handler takes some form of corrective action.

The approach described herein intelligently collects data to determine when a computer system is experiencing an SMI storm, and then it reports that data to the user so that the user may take appropriate action.

Figure 1:
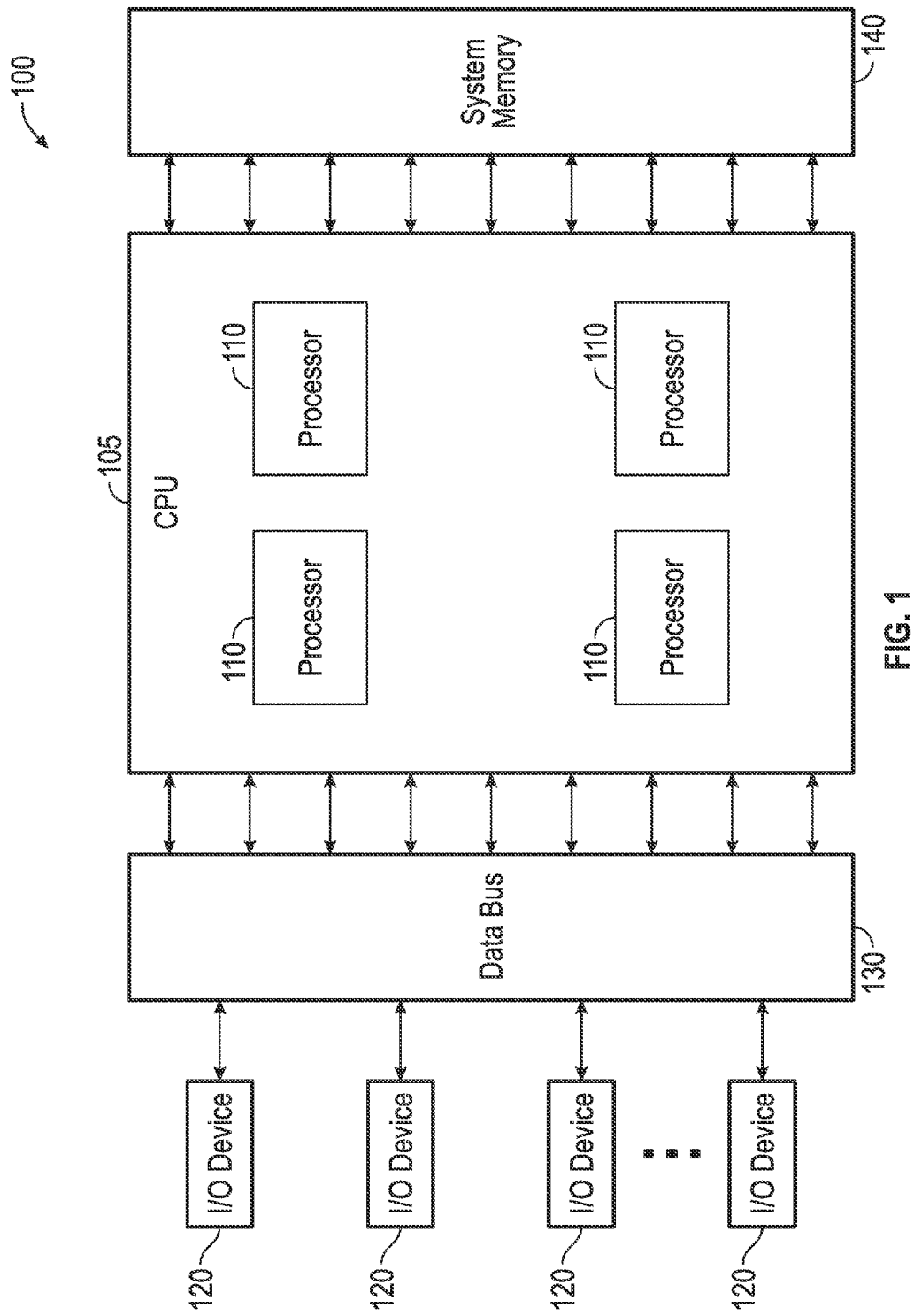
FIG. 1 is a schematic block diagram representation of hardware components of a computer system, according to some embodiments.

Referring now to the drawings, FIG. 1 is a schematic block diagram representation of hardware components of a computer system 100. The computer system 100 may be implemented using any desired platform. For example, the computer system 100 could be realized as any of the following, without limitation: a desktop computer, laptop computer, server, printer, camera, motherboard, or any other device that includes the processor(s) 110. Additional components such as displays and user input components may be employed without departing from the scope of the present disclosure.

The computer system 100 may include: (i) a central processing unit (CPU) 105 having one or more processors or processor cores (e.g., a multiprocessor system) 110, (ii) one or more input/output (I/O) devices 120, (iii) at least one data bus 130, and (iv) system memory 140. In practice, an embodiment of the computer system 100 may include additional or alternative elements and components, as desired for the particular application. Those skilled in the art will recognize that computer system 100 may be constructed from these and other components. However, to avoid obfuscating the embodiments described herein, only those components useful to an understanding of the present embodiment are included.

The CPU 105 may be implemented using any suitable processing system, such as one or more processors 110 (e.g., multiple chips or multiple cores on a single chip), controllers, microprocessors, microcontrollers, processing cores and/or other computing resources spread across any number of distributed or integrated systems, including any number of "cloud-based" or other virtual systems.

The CPU 105 is in communication with at least one I/O device 120 via a data bus 130. The I/O devices 120 may comprise graphics (video) cards, sound cards, TV tuners, USB interfaces, and the like.

The CPU 105 is also in communication with system memory 140. The system memory 140 represents any non-transitory short or long term storage or other computer-readable media capable of storing programming instructions for execution on the processor(s) 110, including any sort of random access memory (RAM), read only memory (ROM), flash memory, magnetic or optical mass storage, and/or the like. It should be noted that the system memory 140 represents one suitable implementation of such computer-readable media, and alternatively or additionally, the CPU 105 could receive and cooperate with external computer-readable media that is realized as a portable or mobile component or application platform, e.g., a portable hard drive, a USB flash drive, an optical disc, or the like.

Figure 2:
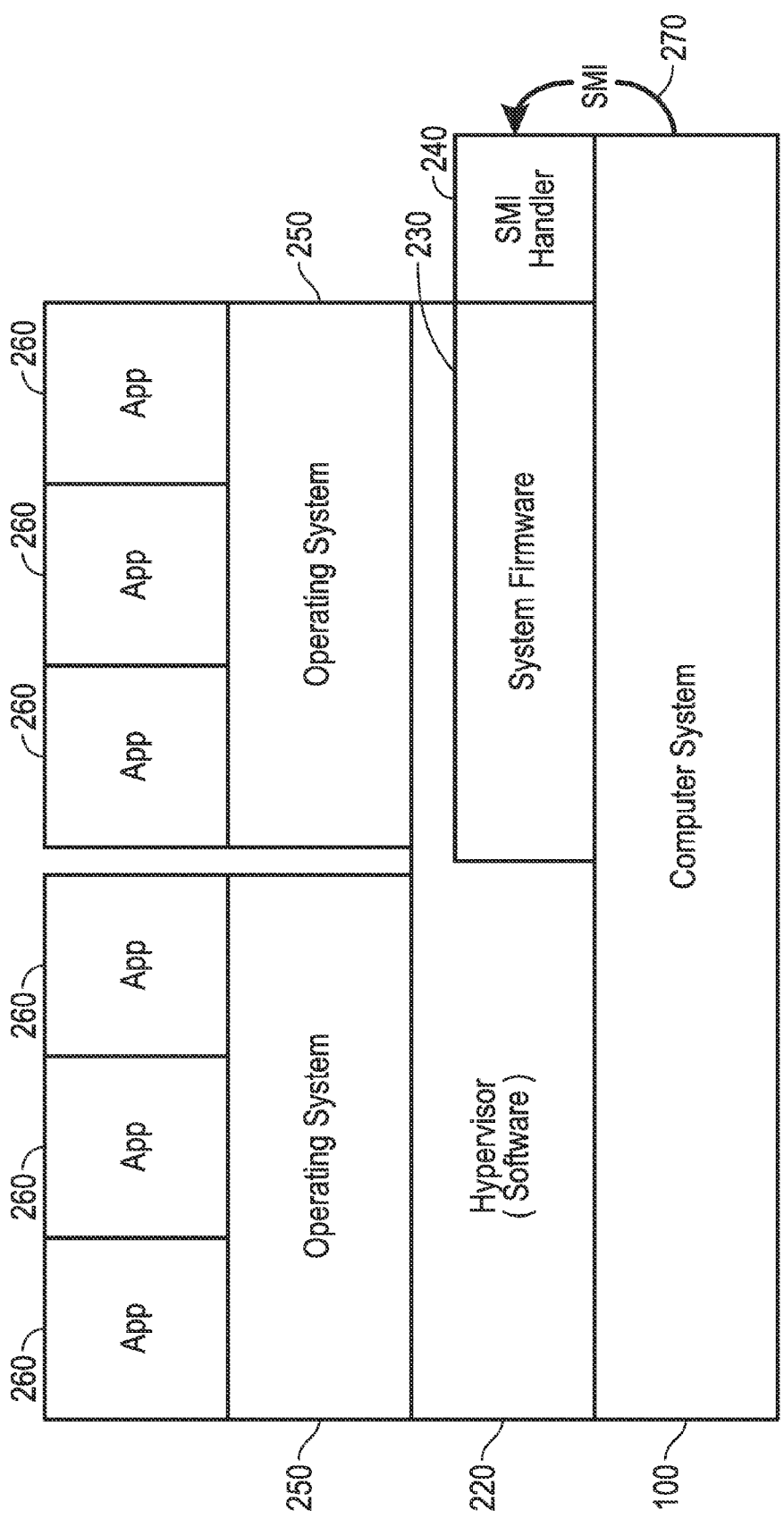
FIG. 2 is a schematic block diagram representation of modules of a computer system, according to some embodiments.

FIG. 2 is a schematic block diagram representation of example modules of the computer system 100, according to some embodiments. In some embodiments, the modules include system firmware 230, a hypervisor 220, an SMI handler 240, at least one operating system 250, and applications 260. These modules may be implemented using software, hardware, firmware, processing logic, or any combination thereof. Furthermore, these modules (e.g., instructions and/or code implementing these modules) may be stored in a computer-readable medium of the computer system 100. The computer-readable medium may include system memory (e.g., DRAM, etc.), non-volatile memory devices, volatile memory devices, and the like.

The system firmware 230 may be implemented as a Basic Input/Output System (BIOS) or a Unified Extensible Firmware Interface (UEFI). The system firmware 230 is given control at the start of the boot process for the computer system 100. It configures the hardware components in the computer system 100 and then loads the software associated with the hypervisor 220.

The hypervisor 220 is a software construct that allows multiple operating systems 250 to share the hardware components of the computer system 100. Each operating system 250 appears to have hardware components of the computer system 100 (e.g., the CPU 105, system memory 140, etc.) all to itself. However, the hypervisor 220 controls the allocation of the hardware components of the computer system 100 to each operating system 250 and ensures that the operating systems 250 cannot disrupt each other. Interrupts, other than SMIs 270, are directed to the hypervisor 220 for proper routing.

The operating systems 250 unknowingly share the hardware components of the computer system 100. Attempts by an operating system 250 to manipulate the hardware components of the computer system 100 or system firmware 230 are intercepted by the hypervisor 220, and the hypervisor 220 conducts the operation on behalf of the operating system 250. Each of the applications 260 is associated with one of operating systems 250, and is started and stopped by the associated operating system 250.

In some embodiments, the SMI handler 240 is included in the system firmware 230. Under normal conditions, SMIs 270 are generated by the hardware components of the computer system 100 and then delivered to the SMI handler 240 for resolution, as shown in FIG. 2. SMIs 270 that originate at the hardware components of the computer system 100 are not intercepted by, and do not interact with, any other part of the computer system 100. SMIs 270 are delivered directly to the SMI handler 240, where they are resolved. The SMI handler 240 is suitably designed and configured to perform a variety of functions and operations as needed to support the SMI management and reporting techniques described in more detail below.

Figure 3:
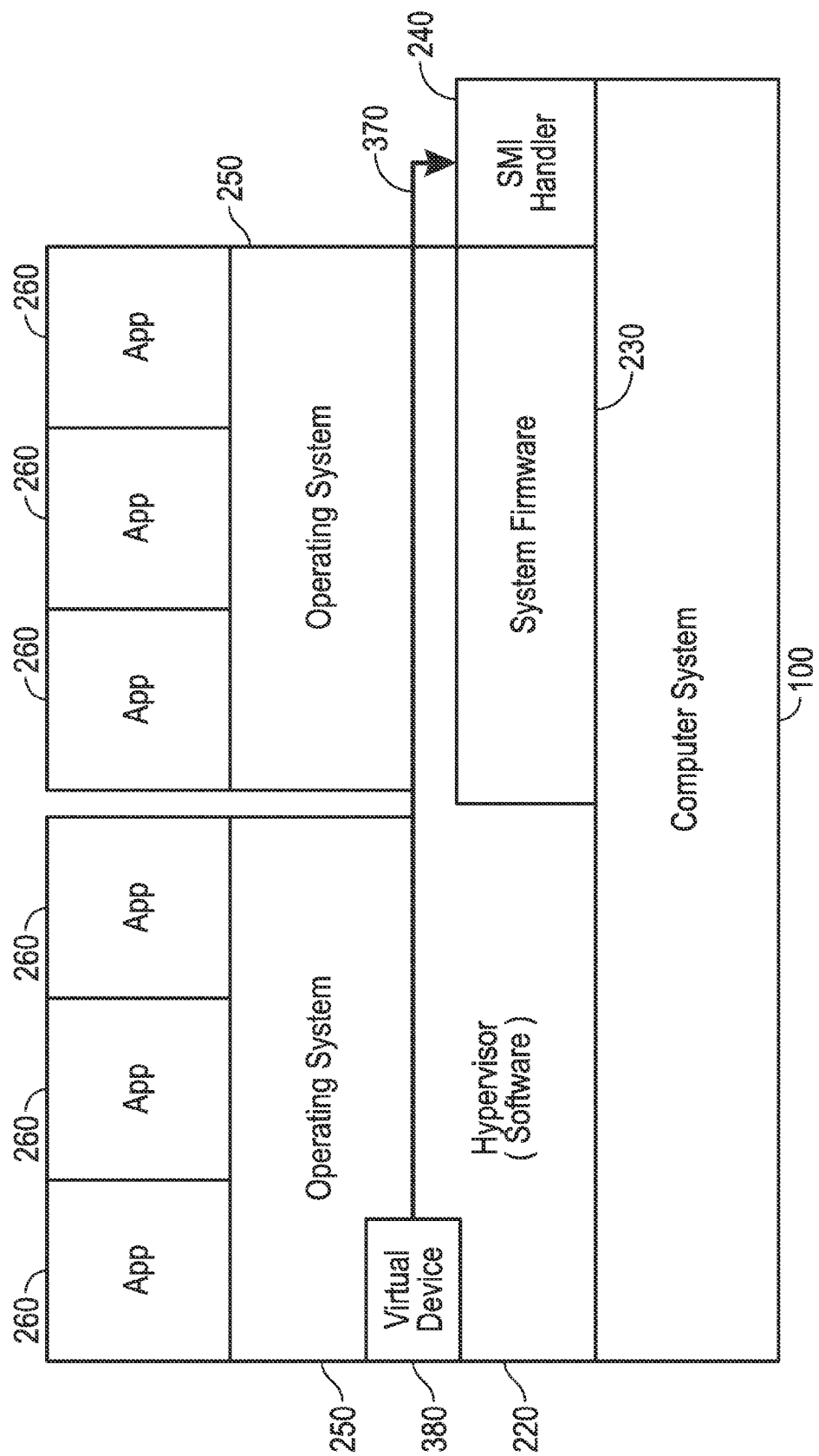
FIG. 3 is a schematic block diagram representation of modules of a computer system, according to some embodiments.

FIG. 3 is another schematic block diagram representation of example modules of the computer system 100, according to some embodiments. The modules of FIG. 3 are similar to the modules of FIG. 2. Thus, only the differences between will be discussed. In particular, FIG. 3 includes a virtual device 380.

The virtual device 380 comprises a device description that mimics a physical device in the computer system 100. In some embodiments, the virtual device 380 is configured to appear to a guest OS 350 as one or more I/O devices 120 (i.e., a physical PO device). The virtual device 380 is associated with a guest OS 350 running directly on the CPU 105 of the computer system 100, but must request use of the hardware components (e.g., the CPU 105, etc.) of the computer system 100 through the hypervisor 320.

Within a computer system, a failure within a guest OS or a hardware failure causes at least one virtual device to generate multiple SMIs (i.e., an SMI "storm"). When an SMI is generated, the computer system goes into system management mode (SMM), which is a protected circumstance, wherein at least some processors (in certain scenarios, every processor) in the computer system suspends normal operations during execution of the SMI. The SMI cannot be blocked or controlled by any other part of the computer system. The SMI is then delivered to the SMI handler, where the issue or system failure that caused the SMI to be generated is resolved. Because there is no way to control or block each SMI, an SMI storm halts operations on all processors within the computer system during the production of multiple SMI, resulting in a denial-of-service (DoS) attack.

Figure 4:
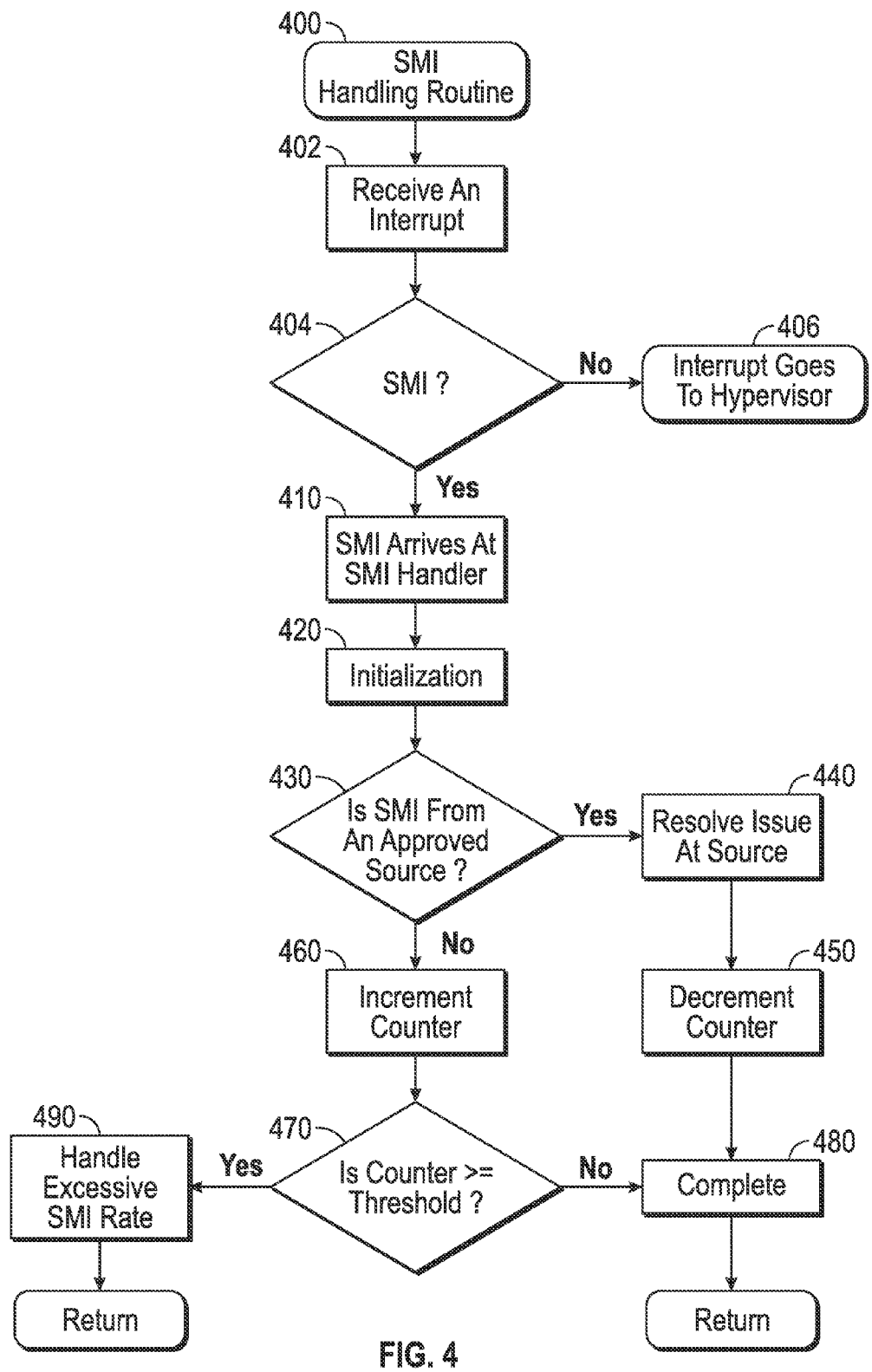
FIG. 4 is a flow chart that illustrates a method of handling interrupts, according to some embodiments.

FIG. 4 is a flow chart that illustrates an SMI handling routine 400. When the SMIs 370 of FIG. 3 are sent to the SMI handler 340, the SMI handler 340 executes the SMI handling routine 400 of FIG. 4. The various tasks performed in connection with a process described here may be performed by software, hardware, firmware, or any combination thereof. For illustrative purposes, the description of a process may refer to elements mentioned above in connection with FIG. 1, FIG. 2, and FIG. 3. In practice, portions of a described process may be performed by different elements of the described system, e.g., the system firmware, the hypervisor, the SMI handler, or other logic in the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the SMI handling routine 400 begins when an interrupt is issued or generated and received for handling (402). In certain embodiments, the SMI handling routine 400 processes or analyzes the received interrupt to identify or determine whether the received interrupt is of a designated type. In this regard, the type of a given interrupt may be one of a plurality of different interrupt signal types, which may include, without limitation, level-triggered interrupts, edge-triggered interrupts, message interrupts, "doorbell" interrupts, and/or SMI. For this particular implementation, the SMI handling routine 400 determines whether the received interrupt is an SMI (404). If the received interrupt is not an SMI, then the interrupt is routed to the hypervisor (406). If, however, the SMI handling routine 400 identifies the received interrupt as an SMI, then the SMI can be provided or delivered such that the SMI arrives at the SMI handler (410). Accordingly, in some embodiments, the SMI handling routine 400 receives an interrupt signal of a designated type from a plurality of interrupt signal types, where the designated type refers to an SMI. In practice, an SMI signal is associated with a set of executable instructions, otherwise known as the SMI handling routine 400, which may be referred to herein as SMI instructions. Moreover, in certain implementations, an SMI signal may include, contain, or otherwise convey a source of the respective SMI using, for example, a resolvable identifier, a flag, a bit field, or the like.

In some embodiments, an initialization task (420) may be performed to enter the set of executable instructions associated with the SMI. In some embodiments, entering the set of SMI instructions, otherwise known as beginning execution of the SMI instructions, creates a protected mode of operation, and exiting the set of SMI instructions, or completing execution of the SMI instructions, terminates the protected mode of operation. During the protected mode of operation, all processors within the computer system 100 suspend normal operations (e.g., execution of application code, etc.) to complete the set of SMI instructions. In some embodiments, the initialization task (420) may include preparing the system memory for the upcoming operations in the SMI handling routine 400.

Once the SMI has arrived (410), the SMI handling routine 400 determines whether the interrupt signal is from an approved peripheral device (430). In some embodiments, the pre-defined peripheral device is found within the system hardware. In some embodiments, an approved peripheral device comprises an I/O device.

Alternatively, the SMI handling routine 400 may determine whether further processing of the set of executable instructions is permitted, based upon the type and the source of the interrupt signal. To make the determination (430), the SMI handler polls each of the plurality of approved peripheral devices in the computer system 100 to inquire whether an SMI was sent by that particular device. In some embodiments, this polling of peripheral devices includes consulting a list of I/O devices located in system memory to locate a base address of each I/O device, and then reading a status register of each I/O device to determine whether or not an SMI was posted by that particular I/O device.

In some embodiments, the SMI handling routine 400 reads identifying information located within the SMI itself to determine whether the SMI was sent by a pre-defined, verified, or otherwise approved I/O device. In some embodiments, the SMI itself comprises information that identifies its source. Accordingly, the SMI handling routine 400 can check the source-identifying information to confirm whether or not the received SMI was issued by an approved device.

If the SMI handling routine 400 confirms that the received SMI was generated by an approved source (430, "yes"), then the problem or issue within the approved source that caused the SMI to be generated is resolved at the approved source (440). In some embodiments, a problem or issue within an approved source may include a hardware failure, overheating, power loss, and/or a failure associated with destruction of a physical structure of the peripheral device and/or the computer system 100. In some embodiments, resolving the problem or issue within the approved source includes performing a corrective action. Thus, corrective action can be performed and completed when the SMI handling routine 400 determines that further processing of the executable instructions is permitted, which in turn is determined when the decision task 430 confirms that the received SMI is from an approved source device.

In some embodiments, the corrective action comprises correcting a malfunction at one of the plurality of verified sources. In some embodiments, the corrective action comprises a resolution to a problem at the pre-defined source, including taking actions to rectify the problem so that normal operations within the peripheral device may continue. In some embodiments, the corrective action may comprise a defined operation to address the malfunction within a peripheral device. For example, terminating power to the peripheral device, effectively shutting the peripheral device down, or turning on cooling fans, thereby protecting the computer system from physical damage.

Following resolution of the problem at the source (440), the SMI handling routine 400 continues by acknowledging that a "legitimate" SMI has been handled. In some embodiments, a counter is decremented (450) in response to the handling of a legitimate SMI. In some embodiments, the counter is incremented when the SMI handling routine 400 determines that the received SMI was issued by an unapproved source (as described in more detail below). An SMI issued by an approved source may be a single, spurious occurrence, or it may be one of a plurality of SMIs issued consecutively, e.g., an SMI storm.

In some embodiments, the counter includes a counter variable stored at a location in system memory. The counter variable may be incremented or decremented by the SMI handling routine 400. In some embodiments, the counter includes a counter variable stored in a counter register.

A non-zero value at the counter shows increased SMI activity, which may be indicative of an SMI storm. However, spurious SMI generation may cause the counter to incrementally increase at times other than the occurrence of an SMI storm, resulting in a false, non-zero value at the counter. In some embodiments, the counter is decremented (450) to normalize the value of the counter due to the occurrence of spurious SMI generation. The step of decrementing the counter (450) need not create an absolute scenario, wherein the counter always contains a value of zero unless an SMI storm is present. However, decrementing the counter (450) upon resolution of a legitimate SMI from a pre-defined, verified, or otherwise approved peripheral device, assists to keep the value of the counter from becoming artificially high, as it counts the occasional and inevitable spurious SMI occurrence, thereby indicating that an SMI storm is taking place. In some embodiments, a "floor" value of zero is set to prevent decrementing the counter to a negative value.

In some embodiments, the counter (450) is decremented linearly. The counter may use other counting schemes as well. For example, in some embodiments, the counter is decremented using an exponential back-off technique, where a right-shift operation is performed within a digital register value to represent a logical divide-by-two operation. These embodiments may be used to rapidly discard an artificially high counter value due to spurious SMIs.

In some embodiments, the counter divides by a number other than two, depending upon the likely rate of spurious SMI production and arrival at the SMI handler.

In some embodiments, the counter is decremented based at least in part on a time (or a time period) at which SMIs are received. For example, if the number of SMIs arriving at the SMI handler is below a pre-determined threshold value within a pre-determined time frame, the counter may be decremented by that number of SMIs. In other words, if the number of SMIs arriving at the SMI handler is below the number indicative of an SMI storm, the counter may effectively forget those SMIs and begin its evaluation over again, when the timer resets itself.

Execution of the instructions associated with the SMI occurs during a protected operating mode wherein the SMI cannot be blocked or regulated in any way. The protected operating mode is created by halting operations on all processors except the specific processor executing the instructions associated with the SMI itself. After the counter has been decremented (450), the SMI handling routine 400 may perform one or more additional completion functions (480) to release the other processors to return to normal operations.

The completion functions (480) bring all of the halted processors out of their dormant state and allow them to return to a normal mode of operation. Following the completion functions (480), the CPU 105 leaves SMM and returns to the normal mode of operation.

If the SMI handling routine 400 receives an SMI 370 that is not from one of a plurality of approved sources (430, "no"), then the counter is incremented (460) and the value of the counter is compared to a threshold value (470). The step of incrementing the counter (460) comprises counting each SMI that arrives at the SMI handler. The counter may be incremented by a constant value (e.g., one, a number other than one, etc.) or incremented by a value determined by a mathematical function (e.g., a function of the current value or prior values of the counter, a function of a prior increment value or values of the counter, a function of time, etc.).

When the value of the counter is greater than or equal to a pre-determined threshold value (470, "yes"), the computer system 100 is experiencing an excessive SMI rate and the SMI handling routine 400 handles (490) the excessive SMI rate. In some embodiments, the pre-determined threshold value is a numeric value stored in memory, and comprises a minimum integer value indicative of an excessive rate of SMI arrival at the SMI handler, e.g., an SMI storm.

Accordingly, in some embodiments, an excessive SMI rate is handled by initiating a corrective action (described below) when the counter reaches a pre-determined threshold value. Further, this corrective action takes place within the protected environment of System Management Mode (SMM) or, in other words, initiating the corrective action while normal operations for each of the plurality of processors is suspended, and then resuming normal operations for each of the plurality of processors afterwards.

As described above with reference to task 490, the SMI handling routine 400 may take corrective action when the counter reaches a pre-determined threshold value. In some embodiments, the corrective action includes creating a report that includes properties of the SMI signal. In this regard, properties of the SMI signal may include the source of the SMIs arriving at the SMI handler. In some embodiments, the source may be a peripheral I/O device. In some embodiments, the source may comprise a virtual representation of a physical peripheral device, implemented within software.

In some embodiments, the corrective action includes recording data describing the conditions of the computer system. In some embodiments, conditions of the computer system 100 may include the frequency of SMIs arriving at the SMI handler 240. In some embodiments, conditions of the computer system 100 may include other diagnostics that will assist in the identification of the device(s) generating the excessive number of SMIs. For example, the SMI handling routine 400 may track the number of SMIs arriving at the SMI handler 240 during a period of time when a specific guest OS has exclusive use of the hardware resources within the computer system 100. If an SMI storm occurs during the period of time controlled by the specific guest OS, then the identity of the device producing the SMIs has been narrowed to those devices associated with the specific guest OS.

After the corrective action has been taken by the SMI handling routine 400, the counter is reset. In some embodiments, the counter is cleared by a computer system 100 reset operation, which executes on every reboot of the computer system 100. In some embodiments, the counter reaches a floor value of zero slowly, via the decrement operation that occurs when an SMI 270 arrives at the SMI handler 240 from an approved source. In some embodiments, the counter is reset to zero at a previously determined time interval.

Alternatively, when the determining step 430 determines that further processing of the set of executable instructions is not permitted, data describing a condition of the system and the type and source of the interrupt signal is recorded, and the set of executable instructions is exited.

If it is determined that the counter value is not greater than or equal to the pre-determined threshold value (the "No" branch of decision step 470), then the SMI handling routine 400 proceeds to task 480 to release the other processors to return to normal operations. Thereafter, the CPU leaves SMM and returns to normal operations, as described previously.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems and methods described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

While at least some embodiments have been presented in the foregoing detailed description, it should be appreciated that a vast number of variations exist. It should also be appreciated that the embodiments described herein are not intended to limit the scope, applicability, or configuration of the claimed subject matter in any way. Rather, the foregoing detailed description will provide those skilled in the art with a convenient road map for implementing the described embodiments. It should be understood that various changes can be made in the function and arrangement of elements without departing from the scope defined by the claims, which includes known equivalents and foreseeable equivalents at the time of filing this patent application.

What is claimed is:

1. A non-transitory computer-readable storage medium having executable instructions stored thereon, wherein, when executed by a processor, the executable instructions perform a method comprising:
    receiving a System Management Interrupt (SMI) signal, wherein the SMI signal is associated with a set of SMI instructions;
    entering the set of SMI instructions;
    determining whether the SMI signal is from one of a plurality of verified sources;
    when the SMI signal is from one of the plurality of verified sources:
        taking corrective action with regard to one of the plurality of verified sources;
        decrementing a counter; and
        exiting the set of SMI instructions;
    incrementing the counter when the SMI signal is not from one of the plurality of verified sources; and
    when the counter reaches a pre-determined threshold value:
        creating a report including properties of the SMI signal; and
        exiting the set of SMI instructions.

2. The non-transitory computer-readable storage medium of claim 1, wherein the corrective action comprises correcting a malfunction at one of the plurality of verified sources.

3. The non-transitory computer-readable storage medium of claim 1, wherein the pre-determined threshold value is indicative of an SMI storm.

4. The non-transitory computer-readable storage medium of claim 1, wherein:
    entering the set of SMI instructions creates a protected circumstance; and
    exiting the set of SMI instructions terminates the protected circumstance.

5. The non-transitory computer-readable storage medium of claim 4, wherein the protected circumstance comprises all processors within a system suspending normal operations to complete the set of SMI instructions.

6. A method for handling SMI behavior, comprising:
    by a computer system,
        receiving a System Management Interrupt (SMI) signal, wherein the SMI signal is associated with a set of SMI instructions;
        entering the set of SMI instructions;
        determining whether the SMI signal is from one of a plurality of verified sources;
        when the SMI signal is from one of the plurality of verified sources:
            taking corrective action with regard to one of the plurality of verified sources;

decrementing a counter; and
exiting the set of SMI instructions;
incrementing the counter when the SMI signal is not from one of the plurality of verified sources; and
when the counter reaches a pre-determined threshold value:
creating a report including properties of the SMI signal; and
exiting the set of SMI instructions.

7. A method for handling interrupt behavior, comprising: by a computer system,
receiving a System Management Interrupt (SMI) signal;
when the SMI signal is determined to be from one of a plurality of verified sources:
resolving an issue that generated the SMI signal at the one of the plurality of verified sources; and
decrementing a counter; and
when the SMI signal is not determined to be from one of the plurality of verified sources:
incrementing the counter; and
taking a corrective action when the counter reaches a pre-determined threshold value.

8. The method of claim 7, wherein resolving the issue comprises correcting a malfunction at the one of the plurality of verified sources.

9. The method of claim 7, wherein taking the corrective action comprises creating a report that comprises information about the SMI signal.

10. The method of claim 7, wherein the pre-determined threshold value is indicative of an SMI storm.

11. The method of claim 7, further comprising:
upon receiving the SMI signal, entering a set of SMI instructions associated with the SMI signal; and
exiting the set of SMI instructions after decrementing the counter or taking the corrective action.

12. The method of claim 11, further comprising:
causing one or more processors in the computer system to suspend operation when entering the set of SMI instructions.

* * * * *